(12) United States Patent
Holm et al.

(10) Patent No.: US 11,537,860 B2
(45) Date of Patent: Dec. 27, 2022

(54) NEURAL NETWORK PROCESSING

(71) Applicant: Arm Limited, Cambridge (GB)

(72) Inventors: Rune Holm, Cambridge (GB); John Wakefield Brothers, III, Calistoga, CA (US)

(73) Assignee: Arm Limited, Cambridge (GB)

( * ) Notice: Subject to any disclaimer, the term of this patent is extended or adjusted under 35 U.S.C. 154(b) by 403 days.

(21) Appl. No.: 16/826,586

(22) Filed: Mar. 23, 2020

(65) Prior Publication Data

US 2021/0295140 A1    Sep. 23, 2021

(51) Int. Cl.
| | | |
|---|---|---|
| *G06N 3/063* | (2006.01) | |
| *G06F 7/50* | (2006.01) | |
| *G06F 17/18* | (2006.01) | |
| *G06F 7/535* | (2006.01) | |
| *G06F 7/523* | (2006.01) | |

(52) U.S. Cl.
CPC ............... *G06N 3/063* (2013.01); *G06F 7/50* (2013.01); *G06F 7/523* (2013.01); *G06F 7/535* (2013.01); *G06F 17/18* (2013.01)

(58) Field of Classification Search
CPC ........ G06F 17/15; G06F 17/153; G06F 17/18; G06F 7/50; G06F 7/535; G06F 7/5443; G06F 7/575; G06N 3/063
See application file for complete search history.

(56) References Cited

U.S. PATENT DOCUMENTS

| | | | | |
|---|---|---|---|---|
| 10,078,620 | B2 * | 9/2018 | Farabet | G06N 3/0454 |
| 2019/0026249 | A1 * | 1/2019 | Talpes | G06N 3/0481 |
| 2019/0317730 | A1 * | 10/2019 | Munteanu | G06N 3/0481 |
| 2020/0089506 | A1 * | 3/2020 | Power | G06N 3/063 |
| 2020/0134417 | A1 * | 4/2020 | Mohapatra | G06N 3/0454 |
| 2020/0150958 | A1 * | 5/2020 | Ahmed | G06F 9/30145 |

* cited by examiner

*Primary Examiner* — Emily E Larocque
(74) *Attorney, Agent, or Firm* — Vierra Magen Marcus LLP

(57) ABSTRACT

A neural network processor is disclosed that includes a combined convolution and pooling circuit that can perform both convolution and pooling operations. The circuit can perform a convolution operation by a multiply circuit determining products of corresponding input feature map and convolution kernel weight values, and an add circuit accumulating the products determined by the multiply circuit in storage. The circuit can perform an average pooling operation by the add circuit accumulating input feature map data values in the storage, a divisor circuit determining a divisor value, and a division circuit dividing the data value accumulated in the storage by the determined divisor value. The circuit can perform a maximum pooling operation by a maximum circuit determining a maximum value of input feature map data values, and storing the determined maximum value in the storage.

16 Claims, 10 Drawing Sheets

NEURAL NETWORK PROCESSING

BACKGROUND

The technology described herein relates to the execution of neural networks on electronic devices, and in particular to the performance of convolution and pooling operations when executing a neural network.

Neural networks can be used for processes such as machine learning, computer vision, and natural language processing operations. It is becoming increasingly common for neural networks to be employed in portable electronic devices, such as mobile phones, tablets and other devices for these purposes.

Neural networks generally comprise a number of layers which each process an input data array to provide an output data array (which becomes the input data array for the next layer). The layers, acting one after the other, may be able to process complex data (e.g. image or sound data) to provide a desired output (e.g. the identification of an object within an image, or a spoken word within a sound clip, or some other usable output inferred from the input data). This process is usually known as "inferencing" or "classification".

The different layers of a neural network may perform different operations on the input data arrays that they receive.

For example, one common neural network layer operation is a convolution operation, which may be performed by a convolution layer of a convolutional neural network (CNN). A convolution operation may typically be performed by convolving an input array of data with a convolution kernel.

Another common neural network layer operation is a pooling operation, which may be performed by a pooling layer of convolutional neural network (CNN). A pooling typically operation operates to "downsample" or "summarise" an input array of data. For example, an "average pooling" operation can summarise input array data values by determining their mean, and a "maximum pooling" operation can summarise input array data values by determining their maximum.

The Applicants believe that there remains scope for improvements to the processing of neural networks on electronic devices, and in particular in relation to the performance of convolution and pooling operations for neural networks on electronic devices.

BRIEF DESCRIPTION OF THE DRAWINGS

Embodiments of the technology described herein will now be described by way of example only and with reference to the accompanying drawings, in which.

Like reference numerals are used for like components in the Figures, where appropriate.

DETAILED DESCRIPTION

Figure 1:
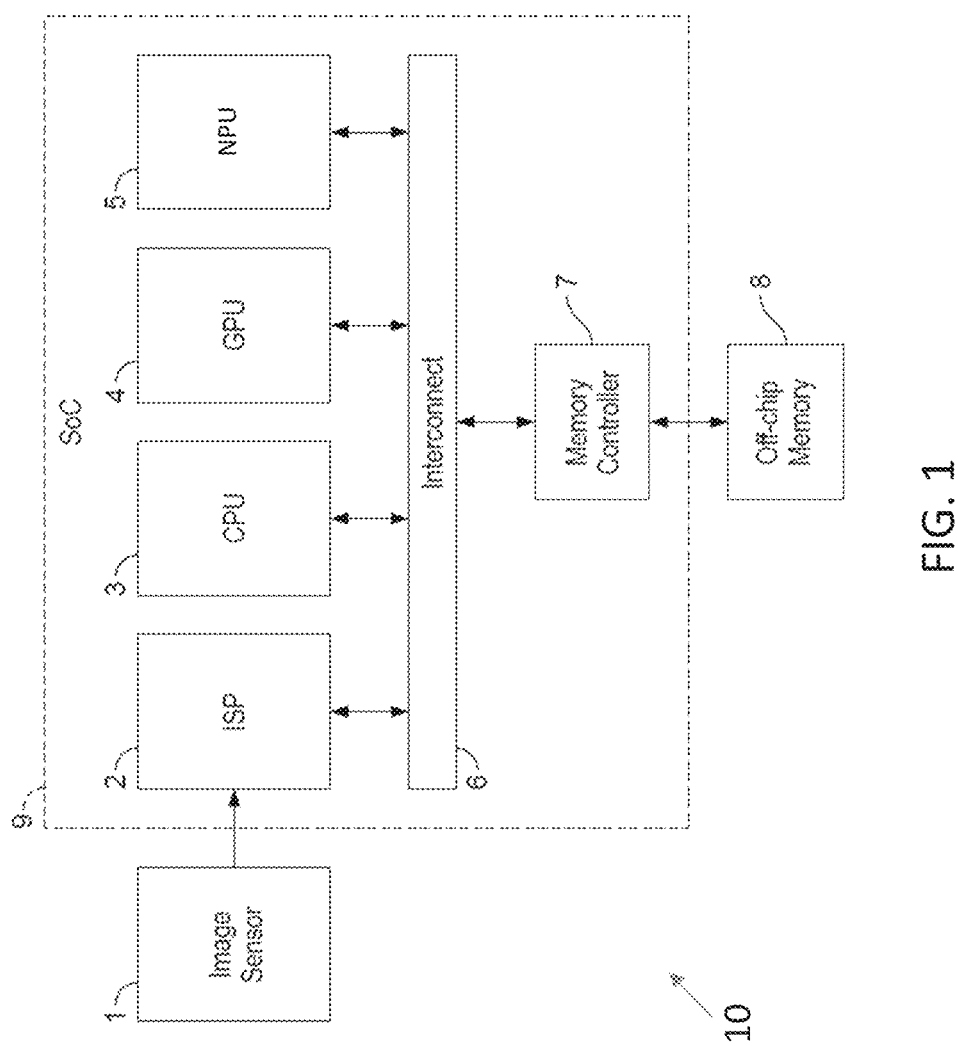
FIG. 1 shows a data processing system which can be operated in accordance with an embodiment of the technology described herein.

A first embodiment of the technology described herein comprises a neural network processor operable to execute a neural network, the neural network processor comprising:
   a combined convolution and pooling circuit configured to perform convolution and pooling operations for a neural network being executed by the processor; the combined convolution and pooling circuit comprising:
      a multiply circuit configured to determine a product of data values;
      storage configured to store data values; and
      an add circuit configured to add a data value to a data value stored in the storage so as to accumulate data values in the storage;
   the combined convolution and pooling circuit further comprising at least one of:
      a divisor circuit configured to determine a divisor value to use to determine a mean of data values accumulated in the storage by the add circuit; and
      a maximum circuit configured to determine a maximum value of data values, and to store the determined maximum value in the storage.

A second embodiment of the technology described herein comprises a method of performing convolution and/or pooling operations when executing a neural network on a neural network processor, the neural network processor comprising:
   a combined convolution and pooling circuit configured to perform convolution and pooling operations for a neural network being executed by the processor; the combined convolution and pooling circuit comprising:
      a multiply circuit configured to determine a product of data values;
      storage configured to store data values;
      an add circuit configured to add a data value to a data value stored in the storage so as to accumulate data values in the storage;
      a divisor circuit configured to determine a divisor value to use to determine a mean of data values accumulated in the storage by the add circuit; and
      a maximum circuit configured to determine a maximum value of data values, and to store the determined maximum value in the storage;
   the method comprising:

the neural network processor executing a neural network; and the combined convolution and pooling circuit performing at least one of a convolution operation, an average pooling operation and a maximum pooling operation for the neural network executing on the neural network processor;

wherein the combined convolution and pooling circuit performing a convolution operation for the neural network executing on the neural network processor comprises:

the multiply circuit determining products of corresponding input feature map and convolution kernel weight values; and the add circuit accumulating the products determined by the multiply circuit in the storage; and the combined convolution and pooling circuit performing an average pooling operation for the neural network executing on the neural network processor comprises:

the add circuit accumulating input feature map data values in the storage; and the divisor circuit determining a divisor value to use to determine a mean of the input feature map data values accumulated in the storage by the add circuit; and the combined convolution and pooling circuit performing a maximum pooling operation for the neural network executing on the neural network processor comprises:

the maximum circuit determining a maximum value of input feature map data values, and storing the determined maximum value in the storage.

The technology described herein relates to the performance of convolution and pooling operations in neural networks. In the technology described herein, a neural network processor (processing unit) is provided with a combined convolution and pooling circuit (engine) which can perform both convolution and pooling operations.

As will be discussed further below, the Applicants have recognised that there are sufficient similarities between neural network convolution and pooling operations that it is possible to provide a single combined convolution and pooling circuit for performing both convolution and pooling operations.

Furthermore, the Applicants have recognised that it is possible for such a combined convolution and pooling circuit to be provided with various shared circuit elements that can be, and are, used in different combinations in order to perform convolution operations and pooling operations.

For example, in the technology described herein, the combined convolution and pooling circuit includes multiply and add circuits which can, and in an embodiment do, operate in conjunction with the storage to perform multiply-accumulate operations. In particular, the multiply circuit can, and does, multiply data values to determine product values, which product values can be, and in an embodiment are, accumulated (summed) in the storage by the add circuit.

As will be explained in more detail below, this can then enable the combined convolution and pooling circuit to perform convolution operations by the multiply circuit determining products of corresponding input feature map and convolution kernel weight values, and the add circuit accumulating (summing) the products determined by the multiply circuit in the storage.

The combined convolution and pooling circuit may further comprise a divisor circuit, which can determine a divisor value to use to determine a mean of data values accumulated (summed) in the storage. The divisor and add circuits can accordingly, and in an embodiment do, operate in conjunction with the storage to perform an average (mean) operation. In particular, the add circuit can, and in an embodiment does, accumulate (sum) data values in the storage to determine a sum value of the data values, which sum value can be, and in an embodiment is, divided by a divisor value determined by the divisor circuit to determine the mean of the data values.

As will be explained in more detail below, this can then enable the combined convolution and pooling circuit to perform "average pooling" operations by determining a mean of input feature map data values.

Furthermore, the combined convolution and pooling circuit may further comprise a maximum circuit, which can determine a maximum value of data values, and store the determined maximum in the storage. Thus, the maximum circuit can, and in an embodiment does, operate in conjunction with the storage to perform a maximum operation.

As will be explained in more detail below, this can enable the combined convolution and pooling circuit to perform "maximum pooling" operations by the maximum circuit determining a maximum value of input feature map data values, and storing the determined maximum value in the storage.

By providing a combined convolution and pooling circuit (engine) which can utilise different combinations of the same circuit elements for both convolution and pooling operations in this manner, the overall hardware/silicon area costs associated with convolution and pooling operations performed by the processor can be reduced, e.g. as compared to performing convolution and pooling operations using separate circuits. Moreover, the overall energy consumption of the processor when executing a neural network can be reduced. This is generally advantageous, but may be particularly advantageous in contexts in which resources are limited, such as in portable devices, e.g. mobile phones and tablets.

It will be appreciated, therefore, that the technology described herein provides an improved neural network processor.

In an embodiment, the neural network processor is a processor that is specifically configured and/or optimised to perform neural network processing. Thus, in an embodiment, the neural network processor is a Neural Network Accelerator/Processor (Neural Processor Unit) (NPU). However, the neural network processor of the technology described herein can also be any suitable and desired processor (processing unit) that is capable of executing a neural network, such as a central processing unit (CPU), a graphics processing unit (GPU) (graphics processor), a video processor, a sound processor, an image signal processor (ISP), or a digital signal processor.

The technology described herein may be used in conjunction with any suitable and desired neural network. In embodiments, the neural network is a convolutional neural network (CNN).

The neural network in an embodiment comprises one or more, and in an embodiment a plurality, of layers, which operate in turn, e.g. such that the output data for one layer becomes the input layer for a next layer. The layers of the neural network may, and in an embodiment do, comprise one or more convolution layers, pooling layers and/or fully connected layers.

The neural network processing of the technology described herein can be used for any suitable form of neural network processing, such as to generate a (useful) output as may be output during inferencing by the neural network, but also during training of the neural network.

The neural network can process any suitable input to produce a useful output. For instance, the input may comprise, an image, such as an image from an Image Signal Processor (ISP) or an image frame from video data, sound data or voice data, or other input data. Correspondingly the neural network may be operable to identify or classify features present within the input, e.g. such as objects in an input image, or sound features in input sound data.

The technology described herein relates to the performance of convolution and pooling operations when performing neural network processing. The technology described herein can be used whenever convolution or pooling operations are being performed during neural network processing. Thus, for any given neural network being executed, the operation in the manner of the technology described herein can be, and in an embodiment is, used for some, and in an embodiment all, of the convolution and pooling operations that are performed during execution of the neural network in question.

A convolution or pooling operation of the technology described herein should, and in an embodiment does, operate on an input data array (an "input feature map" (IFM)) to produce an output data array (an "output feature map" (OFM)). An input data array (feature map) may correspond to an overall input to the neural network, such as an image to be processed, or it may correspond to the output of another (e.g. the previous) layer of the neural network. Similarly, an output data array (feature map) may be for use as an input to another (e.g. the next) layer of the neural network, or the output data array (feature map) may correspond to the overall (useful) output of the neural network processing.

An input or output data array (feature map) can be any suitable array of data elements, and can have any suitable size and number of dimensions. For instance, in the case of two-dimensional RGB image data, an (input) data array may comprise a three dimensional array of data elements, with two dimensions of the array corresponding to the two dimensions of the image, and the third dimension of the array corresponding to the red, green and blue channels of the image.

The combined convolution and pooling circuit can receive data of an input data array (feature map) for neural network processing in any suitable manner. In an embodiment, the combined convolution and pooling circuit further comprises an input circuit configured to read data values of an input data array from memory (and to provide the read data values to other circuits of the combined convolution and pooling circuit for processing as appropriate).

Thus, in an embodiment, the combined convolution and pooling circuit performing a convolution or pooling operation comprises: the input circuit reading (the) input feature map values from memory.

Similarly, the combined convolution and pooling circuit can output processed output data array (feature map) values in any suitable manner. In an embodiment, the combined convolution and pooling circuit further comprises an output circuit configured to write out data values of an output data array to (the) memory.

Thus, in an embodiment, the combined convolution and pooling circuit performing a convolution or pooling operation comprises: the output circuit writing output feature map values to (the) memory.

Data values can be written out to (the) memory by the output circuit in any suitable manner. In an embodiment, the output circuit writing out a data value to (the) memory comprises the output circuit scaling the data value appropriately, e.g. and in an embodiment, to a desired number of bits.

The memory can be any suitable and desired storage. The memory may be an on-chip memory (i.e. on the same chip as the neural network processor), but in an embodiment is an external (main) memory (i.e. not on the same chip as the neural network processor). Where the memory is an external memory, it may be connected to the neural network processor by a suitable interconnect.

A convolution operation performed in accordance with the technology described herein can be any suitable and desired convolution operation for neural network processing. It is in an embodiment a discrete convolution operation performed between an input data array (feature map) and a convolution (filter) kernel to generate an output data array (feature map). In an embodiment, the convolution operation is such an operation for a convolution layer of a (the) neural network that the processor is executing.

A convolution kernel can be provided as desired. In an embodiment, a convolution kernel is provided as a suitable array of data elements, with each data element of the array representing a respective "weight". A (each) weight value of a convolution kernel may be provided as desired. For example, and in an embodiment, each weight value of a convolution kernel is determined during neural network training, in any suitable manner. The size of a convolution kernel (array) can be selected as desired, but should be smaller than the input data array (feature map).

The combined convolution and pooling circuit can receive a convolution kernel array for neural network processing in any suitable manner. In an embodiment, the combined convolution and pooling circuit further comprises a weight input circuit configured to read in data values of a convolution kernel from (the) memory (and to provide the read data values to other circuits of the combined convolution and pooling circuit for processing as appropriate).

Thus, in an embodiment, the combined convolution and pooling circuit performing a convolution operation comprises: the weight input circuit reading in (the) convolution kernel weight values from (the) memory.

It will be appreciated here that weight values may not need to be provided for each and every operation performed by the combined convolution and pooling circuit. For example, a pooling operation may not require weight values. Accordingly, the weight input circuit is in an embodiment inactive when the combined convolution and pooling circuit is performing an operation which does not require weight values, such as, in an embodiment, a pooling operation.

To facilitate this, in an embodiment, the weight input circuit is selectively activatable to read in weight values from (the) memory. In other words, the weight input circuit is in an embodiment controllable to either read in weight values from (the) memory, or to not read in weight values from (the) memory (e.g., to remain inactive).

A (discrete) convolution operation between an input data array (feature map) and a convolution (filter) kernel to generate an output data array (feature map) can be performed in any suitable manner. In an embodiment, a (each) output value of the output data array is calculated by performing a respective multiply-accumulate operation. Each such multiply-accumulate operation in an embodiment comprises, for each weight value of a convolution kernel, calculating the product of the respective weight value with the value of a corresponding element of the input data array (feature map), and summing (accumulating) the calculated product values. The determined sum value is then in an embodiment used as the corresponding output value for the output data array (feature map).

As discussed above, to facilitate this, the multiply circuit and add circuits of the combined convolution and pooling circuit can, and in an embodiment do, operate in conjunction with the storage to perform such multiply-accumulate operations.

Accordingly, the combined convolution and pooling circuit performing a convolution operation in an embodiment comprises, for each output value of an output data array (feature map), performing a multiply-accumulate operation by the multiply circuit determining products of corresponding input feature map and convolution kernel weight values, and the add circuit accumulating (summing) the products determined by the multiply circuit in the storage. An accumulated (summed) value in the storage is then in an embodiment used for the corresponding output value for the output data array (feature map), in an embodiment by the output circuit writing out the accumulated value from the storage to an output data array in (the) memory.

It will be appreciated here that the multiply circuit can be any circuit suitable for determining the product of data values. In an embodiment, the multiply circuit comprises one or more multiplier circuits configured to multiply together two input data values (operands) to produce an output product value.

Similarly, the storage can be any suitable storage. In an embodiment, the storage comprises one or more, and in an embodiment plural, registers, which are in an embodiment local to (i.e. on the same chip as) the neural network processor. A, and in an embodiment each, register may be configured to store a data value in binary form.

Similarly, the add circuit can be any circuit suitable for adding a data value to a data value stored in the storage. In an embodiment, the add circuit comprises one or more adder circuits configured to add together two input data values (operands) to produce an output sum value.

In an embodiment, the data value to be added to the data value stored in the storage (register(s)) is used as one input (operand) to an adder, an output of the storage (register(s)) is used as the other input (operand) to the adder, and the output sum value of the adder is written back to the storage (register(s)). This will then cause the data values to be accumulated (summed) in the storage (register(s)). It will be appreciated here that the storage (register(s)) should be, and in an embodiment is, suitably "cleared" (set to zero) prior to data values being summed (accumulated) in the storage (register(s)).

A pooling operation performed in accordance with the technology described herein can be any suitable and desired pooling operation for neural network processing. It is in an embodiment an operation which "downsamples" or "summarises" an input data array (feature map) to generate an output data array (feature map) which in an embodiment has a reduced size. For example, in an embodiment, a pooling operation operates to reduce the size of an input data array (feature map) in one or more dimensions by a particular, in an embodiment selected, in an embodiment predetermined factor, such as two or four. In an embodiment, the pooling operation is such an operation for a pooling layer of a (the) neural network that the processor is executing.

A pooling operation can operate to downsample or summarise an input data array (feature map) in any suitable manner. In an embodiment, a value for each data element of the output data array (feature map) is determined from the values for plural corresponding data elements of the input data array (feature map), which corresponding data elements in an embodiment fall within a respective, in an embodiment two-dimensional, "window" (region) of the input data array (feature map).

Such a (each) "pooling window" can encompass any suitable subset of some but not all of the data elements of the input data array (feature map). In an embodiment, each such pooling window is regularly sized and shaped, and in an embodiment in the form of a rectangular (such as square) region. Thus, in an embodiment, an input data array (feature map) is divided into pooling windows that each encompass an m×n block of data elements of the input data array (feature map). Different pooling windows could overlap with each other, or each pooling window may not overlap with any other pooling window.

For example, and in an embodiment, an input data array (feature map) may be divided into non-overlapping pooling windows that each encompass a respective 2×2 block of data elements of the input data array (feature map). In this case, each value of the output data array (feature map) will be determined from the values for a respective 2×2 block of data elements of the input data array (feature map), and thus the pooling operation will operate to reduce the size of the input data array (feature map) in two dimensions by a factor of two.

A pooling operation may operate on the values for data elements which are encompassed by a respective pooling window in any suitable manner, to e.g., "summarise" the data values that fall within the respective pooling window. For example, in the case of "average pooling", a pooling operation may operate to determine a mean of data values that fall within a respective pooling window. In the case of "maximum pooling", a pooling operation may operate to determine a maximum value of data values that fall within a respective pooling window.

Other pooling operation arrangements would be possible. However, the combined convolution and pooling circuit of the technology described herein should be, and in an embodiment is, configurable to perform at least one of, and in an embodiment both, average pooling operations and maximum pooling operations. Correspondingly, the combined convolution and pooling circuit comprises at least one of, and in an embodiment both, the divisor circuit and the maximum circuit.

As discussed above, to facilitate average pooling operations the add and divisor circuits of the combined convolution and pooling circuit can, and in an embodiment do, operate in conjunction with the storage to perform average pooling operations.

Accordingly, the combined convolution and pooling circuit performing an average pooling operation in an embodiment comprises, for each output value of an output data array (feature map), the add circuit accumulating (summing) input feature map data values in the storage, and the divisor circuit determining a divisor value to use to determine a mean of the input feature map data values accumulated (summed) in the storage by the add circuit. An accumulated (summed) value in the storage is then in an embodiment divided by the divisor value determined by the divisor circuit to produce an output mean value, which mean value is then in an embodiment used for the corresponding output value for the output data array (feature map).

The divisor circuit can be any circuit suitable for determining a divisor value to use to determine mean of data values accumulated (summed) in the storage. The divisor circuit can accordingly determine a divisor value in any suitable manner. In an embodiment, the divisor circuit determines a divisor value to use to determine mean of data values accumulated in the storage by counting the number of data values added to (accumulated in) the storage by the add circuit.

As will become more clear below, in some situations, however, it may be the case that some data values are added to (accumulated in) the storage for calculation purposes only. This may occur, for example, when "padding" is applied to an array of input data values. In this case, it may be desired to avoid counting any padding elements in order to determine an appropriate divisor value. Thus, in an embodiment, the divisor circuit is configured to determine (count) a number of "valid" (i.e. non-padding) data values added to (accumulated in) the storage by the add circuit.

In another embodiment, the divisor circuit determines a divisor value using a suitable look-up table. For example, a divisor value could be determined from a look-up table based on the position in an input and/or output array that a data value being processed represents.

It will again be appreciated here that a divisor value may not need to be provided for each and every operation performed by the combined convolution and pooling circuit. For example, a divisor value may only be required when performing an average pooling operation. Accordingly, the divisor circuit is in an embodiment inactive when the combined convolution and pooling circuit is performing an operation which does not require a divisor value to be determined, such as, in an embodiment, a convolution operation or a maximum pooling operation.

To facilitate this, in an embodiment, the divisor circuit is selectively activatable to determine a divisor value. In other words, the divisor circuit is in an embodiment controllable to either determine a divisor value, or to not determine a divisor value (e.g., to remain inactive).

A division operation to determine a mean value can be performed in any suitable and desired manner. In an embodiment, the combined convolution and pooling circuit further comprises a division circuit configured to divide an accumulated (summed) value in the storage by a divisor value determined by the divisor circuit.

Thus, in an embodiment, the combined convolution and pooling circuit performing an average pooling operation comprises the division circuit dividing an (the) accumulated data value in the storage by a (the) divisor value determined by the divisor circuit.

The division circuit can be any circuit suitable for performing a division operation. The division circuit could be configured generally to be able to perform any general division operation, e.g. by performing an iterative division operation. However, the Applicants have recognised that there may only be a certain number of fixed divisor values that can be determined by the divisor circuit. In this case, in an embodiment, the division circuit comprises one or more add, multiply and shift circuits, and the division circuit is configured to divide by a fixed divisor value by performing a series of one or more add, multiply and shift operations. This can enable a division operation to be performed efficiently.

The division circuit could operate to divide an accumulated (summed) value in the storage by a divisor value, and then to store the result in the storage, which stored result could then be written out to (the) memory by the output circuit. However, in an embodiment, the output circuit comprises the division circuit, and a division operation is in an embodiment performed by the output circuit reading an accumulated (summed) value in the storage, dividing the read value by a divisor value determined by the divisor circuit, and then writing out the result of the division to an output data array in (the) memory. This can then reduce the overall number of read and/or write operations needed to determine a mean value.

It will be appreciated again here that such a division operation may not need to be performed for each and every operation performed by the combined convolution and pooling circuit, for example it may only be required when performing an average pooling operation. Accordingly, such a division operation is in an embodiment not performed when the combined convolution and pooling circuit is performing an operation which does not require it, such as, in an embodiment, a convolution operation or a maximum pooling operation.

To facilitate this, in an embodiment, the output circuit is selectively configurable to write out a data value from the storage to (the) memory, and also to first divide a data value in the storage by a divisor value determined by the divisor circuit, and then to write out the result of the division operation to (the) memory. In other words, the output circuit is in an embodiment controllable to either divide by a divisor value determined by the divisor circuit when writing out a data value from the storage to (the) memory, or to "directly" write out a data value from the storage to (the) memory (without dividing the data value by a divisor value determined by the divisor circuit).

As also discussed above, to facilitate maximum pooling operations the maximum circuit of the combined convolution and pooling circuit can, and in an embodiment does, operate in conjunction with the storage to perform maximum pooling operations.

Accordingly, the combined convolution and pooling circuit performing a maximum pooling operation in an embodiment comprises, for each output value of an output data array (feature map), the maximum circuit determining a maximum value of input feature map data values, and storing the determined maximum value in the storage. A determined maximum value stored in the storage is then in an embodiment used for the corresponding output value for the output data array (feature map), in an embodiment by the output circuit writing out the maximum value from the storage to an output data array in (the) memory.

The maximum circuit can be any circuit suitable for determining a maximum of input data values. In an embodiment, the maximum circuit comprises one or more comparator circuits configured to compare input data values, to determine the input data value that is largest (in magnitude) using the comparison, and to output (an indication of) the largest (magnitude) input data value.

In an embodiment, when performing a convolution or pooling operation, it may be necessary to take appropriate account of the edges of the input data array (feature map). For example, as mentioned above, it may be desired to apply "padding" to the edges of an input data array in order to account for the array edges. To do this, in an embodiment, the combined convolution and pooling circuit further comprises a padding circuit configured to apply padding to an array of input data values.

Thus, the combined convolution and pooling circuit performing a convolution or pooling operation in an embodiment comprises the padding circuit receiving an array of input data values from the input circuit and applying padding to the array as appropriate (and then passing a (padded) array of data values onwards to other circuit elements of the combined convolution and pooling circuit as appropriate).

The form of padding desired to be applied to an array of input data values may depend on the particular operation being performed by the combined convolution and pooling circuit. For example, when a sum of input data values is to be determined (e.g. for a convolution or average pooling operation), it may be desired to pad an array of input data values with zeros, so that the padding elements do not contribute to the determined sum. When, however, a maximum of input data values is to be determined (e.g. for a maximum pooling operation), it may be desired to pad an array of input data values with a minimum value for the array, so that the padding elements do not contribute to the determined maximum. Moreover, in some situations it may be desired not to apply any array padding.

To facilitate this, in an embodiment, the padding circuit is selectively configurable to apply zero padding to an array of input data values (i.e. to pad the array with zeros), and/or to apply minimum value padding to an array of input data values (i.e. to pad the array with a minimum value for the array), and/or to not apply padding to an array of input data values. In other words, the padding circuit is in an embodiment controllable to perform zero padding, or to perform minimum value padding, or to not perform padding.

The minimum value that an array is padded with could be the smallest data value present in the array, but is in an embodiment the minimum possible value that the data type being used allows for.

Thus, in an embodiment, the combined convolution and pooling circuit performing a convolution operation or an average pooling operation comprises the padding circuit padding an (the) array of input data values with zeros. In an embodiment, the combined convolution and pooling circuit performing a maximum pooling operation comprises the padding circuit padding an (the) array of input data values with a minimum value for the array.

It will be appreciated from the above that input data values from the input circuit may be provided (in an embodiment via the padding circuit) to the multiply circuit for processing (e.g. when the combined convolution and pooling circuit performs a convolution operation), to the add circuit for processing (e.g. when the combined convolution and pooling circuit performs an average pooling operation), and to the maximum circuit for processing (e.g. when the combined convolution and pooling circuit performs a maximum pooling operation).

To facilitate this, the combined convolution and pooling circuit could be provided with three separate paths by which data values can pass from the input circuit to the multiply, add and maximum circuits. However, in an embodiment, there is only a single such path, which in an embodiment passes data values from the input circuit to the multiply circuit (only). In this case, input data values from the input circuit are in an embodiment provided to the add and maximum circuits for processing via the multiply circuit. This can then reduce circuit complexity and overall hardware/silicon area costs.

Thus, data values can pass via the multiply circuit in any suitable and desired manner. In one case, for example when a convolution operation is being performed, the multiply circuit will in an embodiment receive and multiply together input data values, and pass resulting product values onwards to the add circuit and/or maximum circuit. In another case, for example when a pooling operation is being performed, the multiply circuit will in an embodiment receive input data values, and pass the input data values onwards unchanged to the add circuit and/or maximum circuit. To facilitate this, in an embodiment, the multiply circuit is selectively configurable to pass determined product values onwards to the add circuit and/or maximum circuit, and also to pass input data values onwards unchanged to the add circuit and/or maximum circuit.

The multiply circuit can pass data values onwards unchanged in any suitable and desired manner. For example, in an embodiment, the multiply circuit is configured to multiply input data values it receives by unity, and then pass the so-multiplied data values onwards to the add circuit and/or maximum circuit. This will then result in the multiply circuit passing the input data values onwards unchanged.

In this case, the multiply circuit can be configured to multiply input data values by unity in any suitable and desired manner. For example, in an embodiment, the multiply circuit receives a set of unity weight values, and then uses these unity weight values to multiply the input data values. The set of unity weight values could be read by the weight input circuit from (the) memory and then provided therefrom to the multiply circuit, or else the set of unity weight values could be suitably generated, e.g. by the weight input circuit or by the multiply circuit itself.

In an embodiment, however, the multiply circuit comprises a bypass circuit that is configured to pass input data values onwards unchanged (to the add circuit and/or maximum circuit) without the multiply circuit performing a multiply operation. This can then reduce the number of multiply operations performed by the multiply circuit, and so increase processing efficiency and reduce power requirements, for example.

Thus, in an embodiment, the multiply circuit comprises a bypass circuit, and the multiply circuit is selectively configurable to determine a product of data values, and also to pass data values onwards unchanged via the bypass circuit (without performing a multiply operation). In other words, the multiply circuit is in an embodiment controllable to either perform a multiplication operation, or to operate in a bypass mode of operation.

Thus, the combined convolution and pooling circuit performing an average pooling operation in an embodiment comprises the multiply circuit passing (the) input data values onwards unchanged to the add circuit, in an embodiment via the bypass circuit (and without the multiply circuit performing a multiply operation). Correspondingly, the combined convolution and pooling circuit performing a maximum pooling operation in an embodiment comprises the multiply circuit passing (the) input data values onwards unchanged to the maximum circuit, in an embodiment via the bypass circuit (and without the multiply circuit performing a multiply operation). On the other hand, the combined convolution and pooling circuit performing a convolution operation in an embodiment comprises the multiply circuit performing one or more multiply operations to determine one or more product values, and passing the one or more product values onwards to the add circuit.

Data values output from the multiply circuit can be passed onwards to the add circuit and/or maximum circuit in any suitable and desired manner. For example, the combined convolution and pooling circuit could be provided with two separate paths by which data values can pass from the multiply circuit to the add and maximum circuits. However, in an embodiment, there is only a single such path. This can then reduce circuit complexity and overall hardware/silicon area costs.

This single path could pass data values from the multiply circuit to only one of the add and maximum circuits, with data values then being provided to the other of the add and maximum circuits via the only one of the add and maximum circuits, e.g. as discussed above. However, in an embodiment, the add and maximum circuits are provided together as a single combined circuit element which is selectively configurable to perform add and maximum operations. In this case, there is in an embodiment (only) a single path by which data values can pass from the multiply circuit to this combined add and maximum circuit.

Thus, in an embodiment, the combined convolution and pooling circuit comprises a combined add and maximum circuit (comprising the add circuit and the maximum circuit) that is selectively configurable to add a data value to a data value stored in the storage so as to accumulate data values in the storage, and also to determine a maximum value of data values, and to store the determined maximum value in the storage. In other words, the combined add and maximum circuit is in an embodiment controllable to either perform an accumulate operation, or to perform a maximum operation.

Providing a combined add and maximum circuit in this manner can reduce circuit complexity, for example in terms of circuit elements connecting the combined add and maximum circuit to the storage, and thus reduce overall hardware/silicon area costs, for example.

Thus, the combined convolution and pooling circuit performing a convolution operation in an embodiment comprises the combined add and maximum circuit accumulating (the) products determined by the multiply circuit in the storage. Correspondingly, the combined convolution and pooling circuit performing an average operation in an embodiment comprises the combined add and maximum circuit accumulating (the) input feature map data values in the storage. Correspondingly, the combined convolution and pooling circuit performing a maximum pooling operation in an embodiment comprises the combined add and maximum circuit determining a maximum value of (the) input feature map data values, and storing the determined maximum value in the storage.

As discussed above, in various embodiments, the combined convolution and pooling circuit comprises one or more circuits that are selectively activatable or selectively configurable to perform different operations. To facilitate this, in an embodiment, the combined convolution and pooling circuit comprises a control circuit that is configured to activate or select the appropriate configuration of a, and in an embodiment each, circuit element of the combined convolution and pooling circuit that can be controlled in this manner. The control circuit is in an embodiment configured to activate or select the configuration of a (each) circuit element based on the particular operation that the combined convolution and pooling circuit is performing, e.g. and in an embodiment, based on whether the combined convolution and pooling circuit is performing a convolution operation, an average pooling operation or a maximum pooling operation.

Thus, in an embodiment, the control circuit is configured to control a, and in an embodiment each, selectively activatable or selectively configurable circuit of the combined convolution and pooling circuit to perform an appropriate operation based on the operation that the combined convolution and pooling circuit is performing, and in an embodiment in response to a received command and/or configuration data which in an embodiment indicates the operation being performed.

The appropriate operation that the control circuit activates or selects should be, and in an embodiment is, as discussed above. Thus, for example, and in an embodiment, when a convolution operation is being performed, the control circuit controls at least one of:

the weight input circuit to read in weight values from memory;
the output circuit to write out a data value in the storage to memory;
the padding circuit to pad an array of input data values with zeros;
the multiply circuit to determine a product of data values; and
the combined add and maximum circuit to accumulate products determined by the multiply circuit in the storage.

In an embodiment, when an average pooling operation is being performed, the control circuit controls at least one of:
the divisor circuit to determine a divisor value;
the output circuit to divide a data value in the storage by a divisor value determined by the divisor circuit, and then write out the result of the division operation to memory;
the padding circuit to pad an array of input data values with zeros;
the multiply circuit to pass data values onwards unchanged to the add circuit, in an embodiment via the bypass circuit; and
the combined add and maximum circuit to accumulate data values in the storage.

In an embodiment, when a maximum pooling operation is being performed, the control circuit controls at least one of:
the output circuit to write out a data value in the storage to memory;
the padding circuit to pad an array of input data values with a minimum value for the array;
the multiply circuit to pass data values onwards unchanged to the maximum circuit, in an embodiment via the bypass circuit; and
the combined add and maximum circuit to determine a maximum value of data values, and to store the determined maximum value in the storage.

A, and in an embodiment each, circuit of the combined convolution and pooling circuit discussed above may be, and in an embodiment is, in the form of a fixed-function unit (hardware), i.e. a circuit that is dedicated to one or more functions that cannot be changed. Providing a fixed-function unit can reduce the processing (and therefore power) requirements of the neural network processor, e.g. as compared to programmable circuitry that can be programmed to perform the desired operation. This is because, e.g., a fixed-function unit is typically smaller and uses less power than a more general-purpose unit, and there is no need for generating and executing program instructions.

Thus, in an embodiment, one or more, and in an embodiment each, of the multiply circuit, the add circuit, the divisor circuit, the maximum circuit, the input circuit, the output circuit, the weight input circuit, the division circuit, the padding circuit, the bypass circuit, and the combined add and maximum circuit comprises, or is, a fixed-function unit.

The neural network processor of the technology described herein is in an embodiment implemented in and as part of an overall data processing system that (further) includes one or more of: a host processor (central processing unit (CPU)), a graphics processing unit, a display controller, a video processor (codec), a sound processor, an image signal processor (ISP), a digital signal processor, a system bus, and a memory controller.

The host processor may execute applications that can require neural network processing by the neural network processor, and send appropriate commands and/or data to (a (the) control circuit of) the neural network processor to cause it to perform neural network processing operations and to produce a neural network processing output required by applications executing on the host processor (including in the manner of the technology described herein).

The data processing system in an embodiment has or is in communication with a (the) memory in which data relating to the neural network processing may be stored (e.g. via the memory controller).

The technology described herein can be implemented in any suitable system, such as a suitably configured microprocessor based system. In an embodiment, the technology described herein is implemented in a computer and/or micro-processor based system. The data processing system may be a microprocessor, a programmable FPGA (Field Programmable Gate Array), etc.

The various functions of the technology described herein may be carried out in any desired and suitable manner. For example, the functions of the technology described herein may be implemented in hardware or software, as desired. Thus, for example, the various functional elements and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program comprising computer software code for performing the methods herein described when the program element is run on a data processor, and a computer program comprising code configured to perform all the steps of a method or of the methods herein described when the program is run on a data processing system.

The technology described herein also extends to a computer software carrier comprising such software which when used to operate a data processing system causes in a processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

FIG. 1 shows a data processing system 10 which may be used to perform neural network processing. The data processing system comprises an image sensor 1 which may be operable to provide image data to an image signal processor (ISP) 2. The image signal processor (ISP) 2 may process the image data to provide data that is suitable for use as input data for neural network processing. The data processing system also comprises a central processing unit (CPU) 3, graphics processing unit (GPU) 4 and a neural network processing unit (accelerator) (NPU) 5.

The CPU 3 may be operable to control the components of the data processing system 10, for example by issuing appropriate commands. The GPU 4 may be operable to perform graphics processing. The NPU 5 may be a processor which is specifically configured or optimised to perform neural network processing, such as performing identification or classification of objects within images that are provided by the image sensor 1, ISP 2 or GPU 4.

The data processing system comprises an interconnect 6 which provides an interface between the various processors (ISP, CPU, GPU and NPU) and a memory controller 7. The memory controller 7 is operable to manage memory read and write requests, and to control reading and writing of data to off-chip memory 8.

The ISP 2, CPU 3, GPU 4, NPU 5, interconnect 6 and memory controller 7, may be provided as part of a system-on-chip 9. The image sensor 1 may be located off-chip. The off-chip memory 8 may comprise a main memory which is external to the system-on-chip.

Other arrangements for the data processing system would be possible. For example, although an image sensor 1 is shown in FIG. 1 for providing input data in the form of image data, other sensors or input devices could be incorporated within the data processing system, such as for example, a sound input device.

Figure 2:
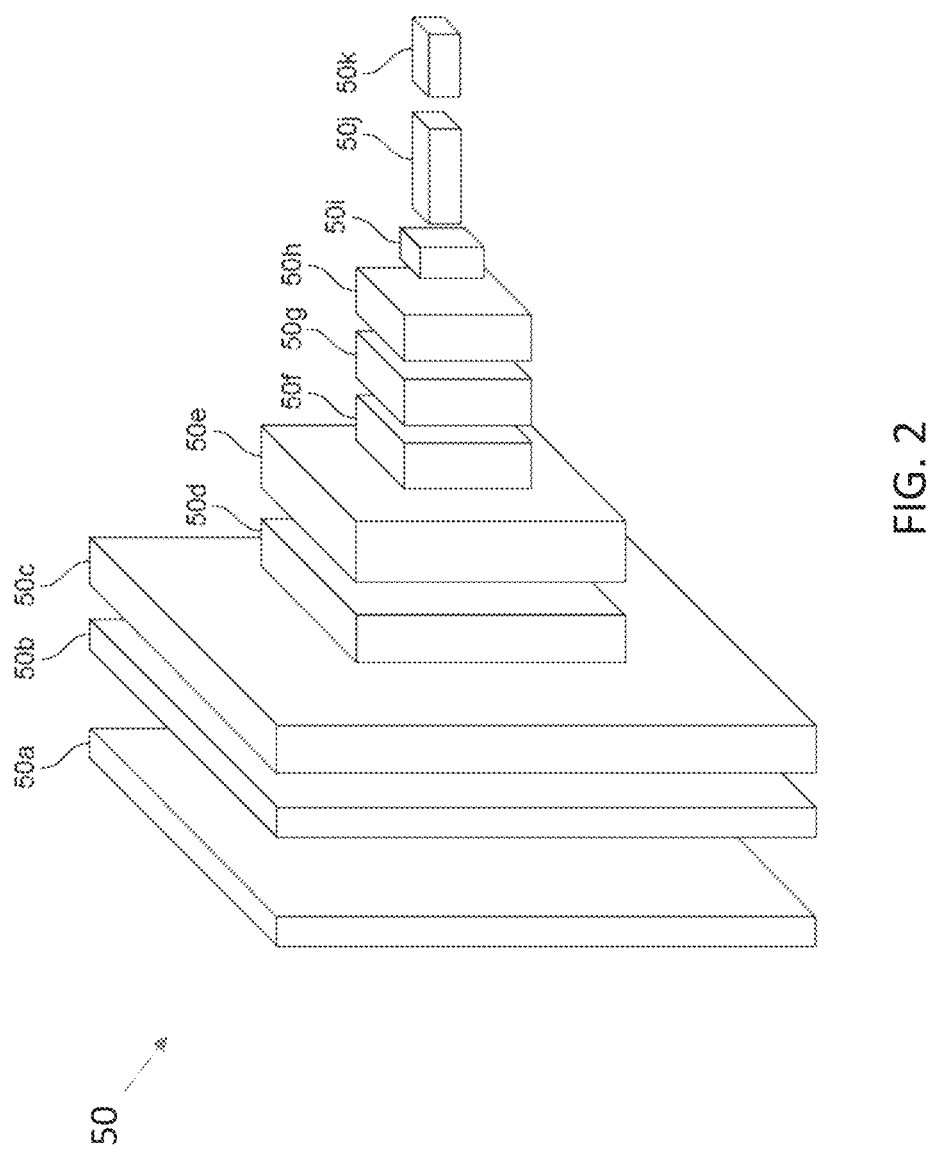
FIG. 2 shows schematically a convolutional neural network (CNN) that can be processed in embodiments of the technology described herein.

FIG. 2 illustrates an exemplary neural network 50, which may be processed by the data processing system 10 of FIG. 1. The neural network 50 may be any suitable neural network, but in the present embodiment, the neural network is a convolutional neural network (CNN), which is the type of neural network shown in FIG. 2. The CNN comprises a number of layers 50a-50k which operate one after the other, such that the output data from one layer is used as the input data for a next layer.

The CNN shown in FIG. 2 comprises an input layer 50a. The input layer 50a receives an input data array (e.g. comprising data corresponding to image or sound data), and passes that data array on to the next layer of the neural network. The layers 50b-50i shown in FIG. 2 are convolution and/or pooling layers.

A first layer 50b may comprise a convolution layer. The convolution layer may receive data generated by the input layer 50a for use as input data. The first convolution layer may generate output data comprising an output feature map. The output feature map may comprise a representation of features that were present in the data array that was received by the convolution layer. The output feature map may be used as the input data (i.e. as an input feature map) for a subsequent layer of neural network processing.

For example, a pooling layer 50c may be provided after a convolution layer. The pooling (or "downsampling") layer may operate to reduce the size of a data array (e.g. feature map) that is input into the pooling layer. The pooling layer may produce (output) a data array (e.g. a further feature map) which is an "equivarient" representation of the data array that was input into the pooling layer (meaning that the representation is almost invariant to changes in the scale and position of features in the data array that was input into the pooling layer). The neural network may comprise further convolution layers 50d, 50f, 50g and pooling layers 50e, 50h, 50i.

Although not shown in FIG. 2, the CNN may comprise one or more further activation layers. For example, a suitable non-linearity, e.g. in the form of a Rectified Linear Unit (ReLU) function, may be applied in between a convolution layer and a pooling layer. Additionally or alternatively, the CNN may comprise one or more "deconvolution" layers, which each operate to increase the size of the data array that is input into the "deconvolution" layer, e.g. such that an output having a desired output resolution is produced.

After the various layers of the CNN, the CNN may comprise a fully connected (FC) layer 50j. The fully connected layer may operate on a data array (e.g. feature map) generated by prior layers. Alternatively (although not shown in FIG. 2), the neural network could comprise multiple fully connected layers. In this case, the fully connected layers may operate one after the other such that the data that is output from one fully connected layer is used as the input data for a next fully connected layer.

The final layer may produce a final output data array or output data set which may comprise a useful output (e.g. an identification or classification of an object in the, e.g. image, that was originally received by the input layer of the CNN).

The final layer passes the useful output to the output layer 50k of the neural network. The output layer 50k comprises a number of processing nodes which receive the useful output data and pass the useful output data on towards other components of the data processing system which are outside of the neural network (e.g. such as further processing and display components which can display the output data, for example).

Although FIG. 2 shows a certain number of layers, the neural network may comprise fewer or more layers if desired (and may also or instead comprise other layers which operate in a different manner to the various layers described herein).

It will be appreciated from the above that implementing a convolutional neural network (CNN) typically requires a large number convolution and/or pooling operations to be performed, and that it is therefore desirable to improve the efficiency with which such operations are performed.

Neural network convolution operations are typically carried out by performing a discrete convolution between an input feature map (array) and one or more convolution (filter) kernels to generate an output feature map (array).

The input feature map may be a suitable array of data elements. One dimension of the input feature map may correspond to a "channel" dimension. For example, in the case of an input two-dimensional RGB image, the input feature map may be a three-dimensional array, with two dimensions of the array corresponding to the two dimensions of the image, and the third dimension of the array corresponding to the red, green and blue channels of the image.

A convolution (filter) kernel may be an array of data elements, with each data element of the array representing a "weight". Each weight value may be determined during training of the neural network, in any suitable manner. The size and dimensions of a convolution (filter) kernel can be selected as desired, but it should be smaller in size than the input feature map.

The output feature map may be a suitable array of data elements. Calculating the output feature map may involve a kernel "sliding" (convolving) over an input feature map, such that the kernel is positioned in a different location with respect to the input feature map for each element of the output feature map. At each location that the kernel is positioned with respect to the input feature map, the product of each weight value of the kernel with the value of the corresponding element of the input feature map (i.e. the element wise multiplication) may be calculated, and the sum of the products may be used as the corresponding output value for the output feature map. Where the input feature map comprises multiple channels, the convolution operation may typically be such that output values represent a sum over all of the channels.

The size of an output feature map may thus depend on the size of the input feature map and convolution kernel. The size of an output feature map may also depend on the convolution "stride". For example, in the case of a stride value of 1, output data values may be calculated for each possible location in the input feature map, whereas larger stride values will result in smaller sized output feature maps.

The size of an output feature map may also depend on the handling of the edges of the input feature map, e.g. "padding". For example, in the case of "VALID" padding, output data values are only calculated for locations in the input feature map where each element of the kernel has a corresponding "valid" data element in the input feature map. In this case, the output feature map may typically be smaller than the input feature map.

"SAME" padding, by contrast, attempts to ensure that input and output feature maps have the same size, by allowing the convolution kernel to be partially applied at the edges of the input feature map. "SAME" padding may involve padding the edges of the input feature map with a suitable number of zeros, and then applying the full convolution kernel to the padded input feature map. Padding the input array with zeros will then ensure that the padding elements do not contribute to the output sum.

Other array edge handling arrangements are possible.

In addition to convolution operations as discussed above, neural network processing typically includes performing neural network processing pooling operations. Such neural network processing pooling operations may typically be relatively more complex than convolution operations, and may require a higher degree of configurability.

Figure 3:
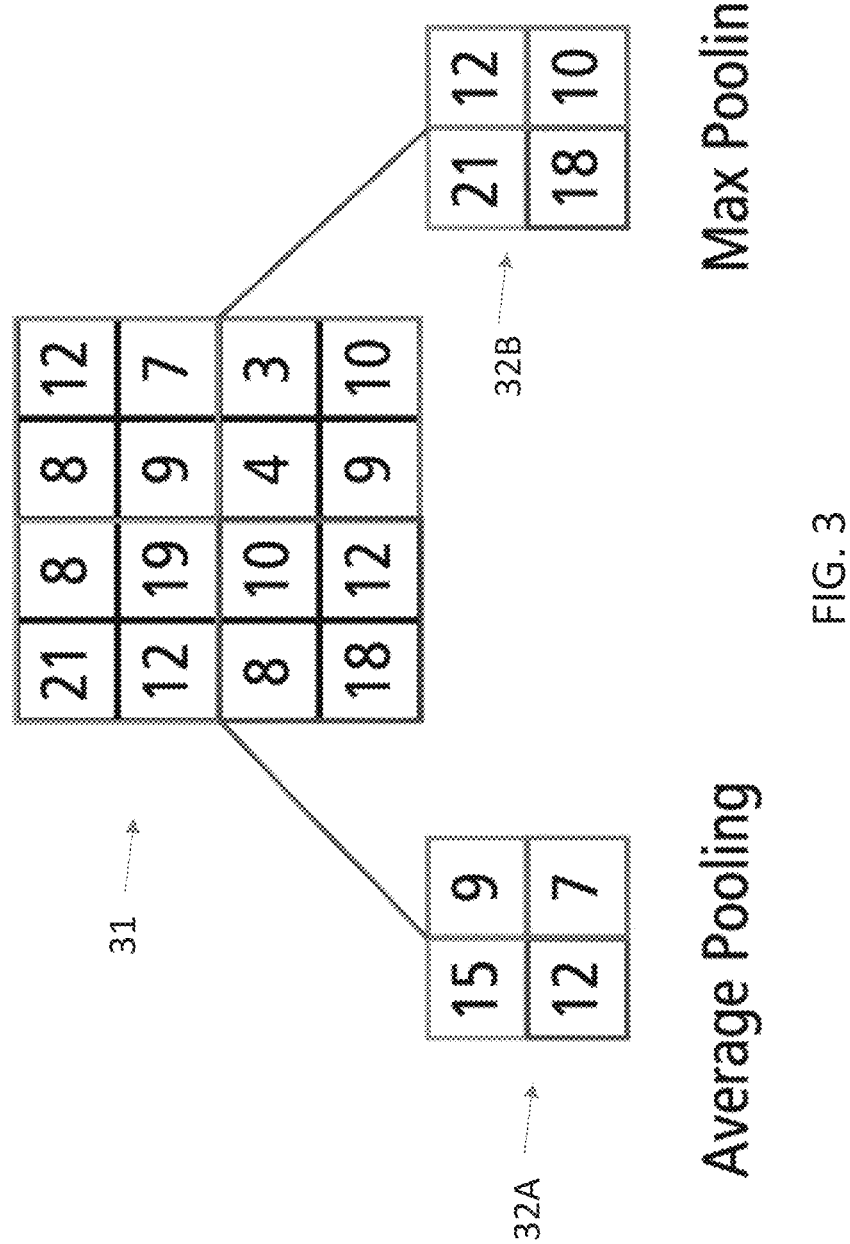
FIG. 3 illustrates exemplary neural network pooling operations.

For example, FIG. 3 illustrates examples of two different neural network pooling operation modes: "average pooling" and "max pooling" ("maximum pooling"). As discussed above, a pooling operation may operate to downsample an input data array (e.g. feature map), e.g. in order to summarise features detected in the input. Typically, each dimension of the input data array is reduced in size by a factor of two. For example, as shown in FIG. 3, a two-dimensional input array 31 may be divided into non-overlapping 2×2 blocks of elements, and each 2×2 block of input data elements may correspond to a single output data element of an output data array 32A, 32B.

In the case of average pooling, each output value corresponds to an average (mean) of the corresponding set of, e.g. 2×2, input values. For example, in the case of the upper-left 2×2 block of input data elements in the input data array 31 of FIG. 3, the average pooling operation calculates an average (mean) of the values 21, 8, 12 and 19 to be 15.

In the case of maximum pooling, each output value corresponds to the maximum of the corresponding set of, e.g. 2×2, input values. For example, in the case of the upper-left 2×2 block of input data elements in the input data array 31 of FIG. 3, the maximum pooling operation calculates the maximum of the values 21, 8, 12 and 19 to be 21.

Where the input feature map comprises multiple channels, a pooling operation may typically be performed for each channel separately.

Other pooling (downsampling) arrangements are possible.

As in a convolution operation, in a pooling operation, it may be necessary to take account of the edges of the input array. In the case of maximum pooling, the input array may be padded with the minimum possible value that the data type being used allows for. Padding the array with the minimum value ensures that padding elements do not affect the determined maximum.

In the case of average pooling, where an output corresponds to a sum of elements divided by the number of summed elements, the input array may be padded with zeros so that padding elements do not contribute to the output sum, and then the sum may be divided by the number of "valid" elements (i.e. the number of summed elements that are not padding elements).

The Applicants have recognised that it is possible to provide suitable fixed function circuitry that is configured to perform neural network convolution and pooling operations, and moreover that this can allow improved processing efficiency and reduced power requirements when performing convolution and pooling operations, e.g. as compared to performing convolution or pooling operations in software executed by programmable processing circuitry.

Furthermore, the Applicants have recognised that there are sufficient similarities between neural network convolution and pooling operations that it is possible to provide a single combined convolution and pooling engine (circuit) that can share circuit elements for the purpose of performing both convolution and pooling operations.

By providing such a combined convolution and pooling hardware engine (circuit), the total hardware/area costs associated with performing convolution and pooling operations can be reduced, e.g. as compared to performing convolution and pooling operations using separate circuits. Moreover, the use of fixed function hardware circuitry to perform both convolution and pooling operations can improve processing efficiency and reduce power requirements, e.g. as compared to performing some or all of such operations in software executing on a programmable processing circuit.

Figure 4:
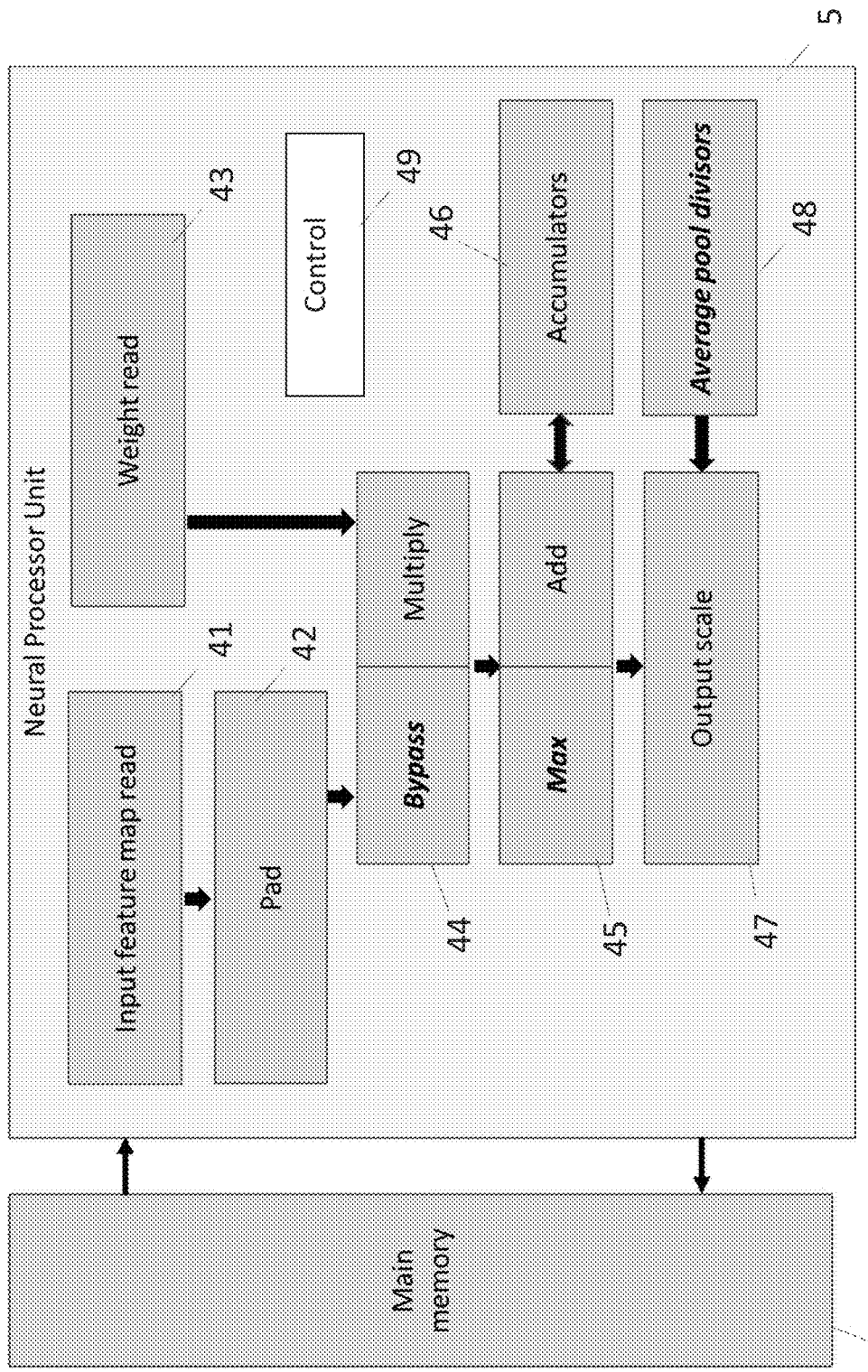
FIG. 4 shows schematically a neural network processing unit (NPU) in accordance with an embodiment of the technology described herein.

FIG. 4 shows in more detail the improved neural network processing unit (NPU) 5 of the present embodiment which may be used in the system of FIG. 1. The NPU 5 comprises a fixed function hardware combined convolution and pooling engine (circuit) configured to perform both convolution and pooling operations to implement both convolution and pooling layers of a neural network. It will be appreciated here that the network processing unit (NPU) 5 may comprise other circuit elements which are not shown in FIG. 4.

As can be seen in FIG. 4, the combined convolution and pooling engine of the present embodiment comprises a collection of fixed function circuits 41-48, with each circuit configured to perform one or more respective operations in order to perform a convolution and/or a pooling operation. The combined convolution and pooling engine further comprises a control circuit 49 which, as will be discussed in more detail below, can (in response to commands received from the host processor (CPU) 3) selectively control circuit elements of the combined convolution and pooling engine to perform respective operations (or not) in various different combinations in order to perform convolution and pooling operations.

As can be seen in FIG. 4, the combined convolution and pooling engine comprises an input feature map read circuit 41 (input circuit) that is configured to read, from the external memory 8, data of an input feature map (IFM) that is to undergo a convolution or pooling operation.

The combined convolution and pooling engine further comprises a padding circuit 42 that is configured to apply appropriate padding to an input feature map array. As discussed above, the appropriate padding option may depend on the particular operation that is being performed, and so the padding circuit 42 is selectively configurable to pad an input data array with zeros, e.g. for convolution and average pooling operations, and also to apply minimum value padding to an input array, e.g. for maximum pooling operations. The padding circuit 42 is also able to pass input data onwards without performing a padding operation.

The control circuit 49 is correspondingly configured to control the padding circuit 42 to perform the appropriate padding mode, e.g. zero padding when a convolution or average pooling operation is being performed, and minimum value padding when a maximum pooling operation is being performed.

The combined convolution and pooling engine further comprises a weight read circuit 43 (weight input circuit). The weight read circuit 43 is configurable to read, from the external memory 8, weight values of a convolution filter kernel that is to be applied to an input feature map.

As discussed above, depending on the particular operation that is being performed, weight values may or may not be needed by the combined convolution and pooling engine. Accordingly, the weight read circuit 43 is selectively activatable to read in weight values.

The control circuit 49 is correspondingly configured to control the weight read circuit 43 to read in weight values when appropriate, e.g. when a convolution operation is being performed, but, e.g., not when a pooling operation is being performed.

The combined convolution and pooling engine further comprises a multiply/bypass circuit 44 (multiply circuit comprising a bypass circuit) that is selectively configurable to perform element wise multiplication operations between input values of an (padded) input feature map and weight values of a convolution kernel, e.g. for a convolution operation, but also to operate in a bypass mode, in which input values of an (padded) input feature map are passed onwards (to add/max circuit 45) without having undergone a multiplication operation. As discussed above, this "bypass" mode can enable efficient support of pooling operations.

The control circuit 49 is accordingly configured to control the multiply/bypass circuit 44 appropriately, e.g. to perform multiplication operations when a convolution operation is being performed, and to operate in a "bypass" mode when a pooling operation is being performed.

The combined convolution and pooling engine further comprises accumulators (registers) 46 (storage) that can store data values being processed by the combined convolution and pooling engine.

The combined convolution and pooling engine further comprises an add/max circuit 45 (combined add and maximum circuit) that is selectively configurable to add an output data value of the multiply/bypass circuit 44 to a data value stored in accumulators 46, i.e. so as to accumulate (sum) the data values, e.g. for performing convolution and average pooling operations, and also to determine a maximum of input data values, and to store a determined maximum value in accumulators 56, e.g. for performing maximum pooling operations.

The control circuit 49 is accordingly configured to control the add/max circuit 45 appropriately, e.g. to perform an accumulate (add) operation when a convolution or average pooling operation is being performed, and to perform a maximum operation when a maximum pooling operation is being performed.

The combined convolution and pooling engine further comprises an output scale circuit 47 (output circuit). The output scale circuit 47 is configured to read data values in accumulators 46, scale the read values to a desired number of bits, and write out the result to an output feature map in the external memory 8.

The combined convolution and pooling engine of FIG. 4 further comprises an average divisor circuit 48 (divisor circuit) that is configurable to determine (e.g. count) a number of "valid" elements that have been accumulated (summed) in the accumulators 46 by the add/max circuit 45. As will be discussed below, the so-determined number of "valid" elements can then be used as a divisor when determining an average (mean) of the data values accumulated in the storage 46. Output scale circuit 47 is correspondingly configurable to divide an output of accumulators 46 by a divisor determined by the average divisor circuit 48. This then enables support of average pooling operations.

However, such a division operation may not be required when performing other operations, such as convolution and maximum pooling operations. Accordingly, the average divisor circuit 48 is selectively activatable to determine a divisor value, and the output scale circuit 47 is similarly selectively activatable to perform a division operation.

The control circuit 49 is correspondingly configured to control the average divisor circuit 48 appropriately, e.g. to determine a divisor when an average pooling operation is being performed, but, e.g., not when a convolution or maximum pooling operation is being performed. Similarly, the control circuit 49 is configured to control the output scale circuit 47 appropriately, e.g. to perform a division operation when an average pooling operation is being performed, but, e.g., not when a convolution or maximum pooling operation is being performed.

Figure 5:
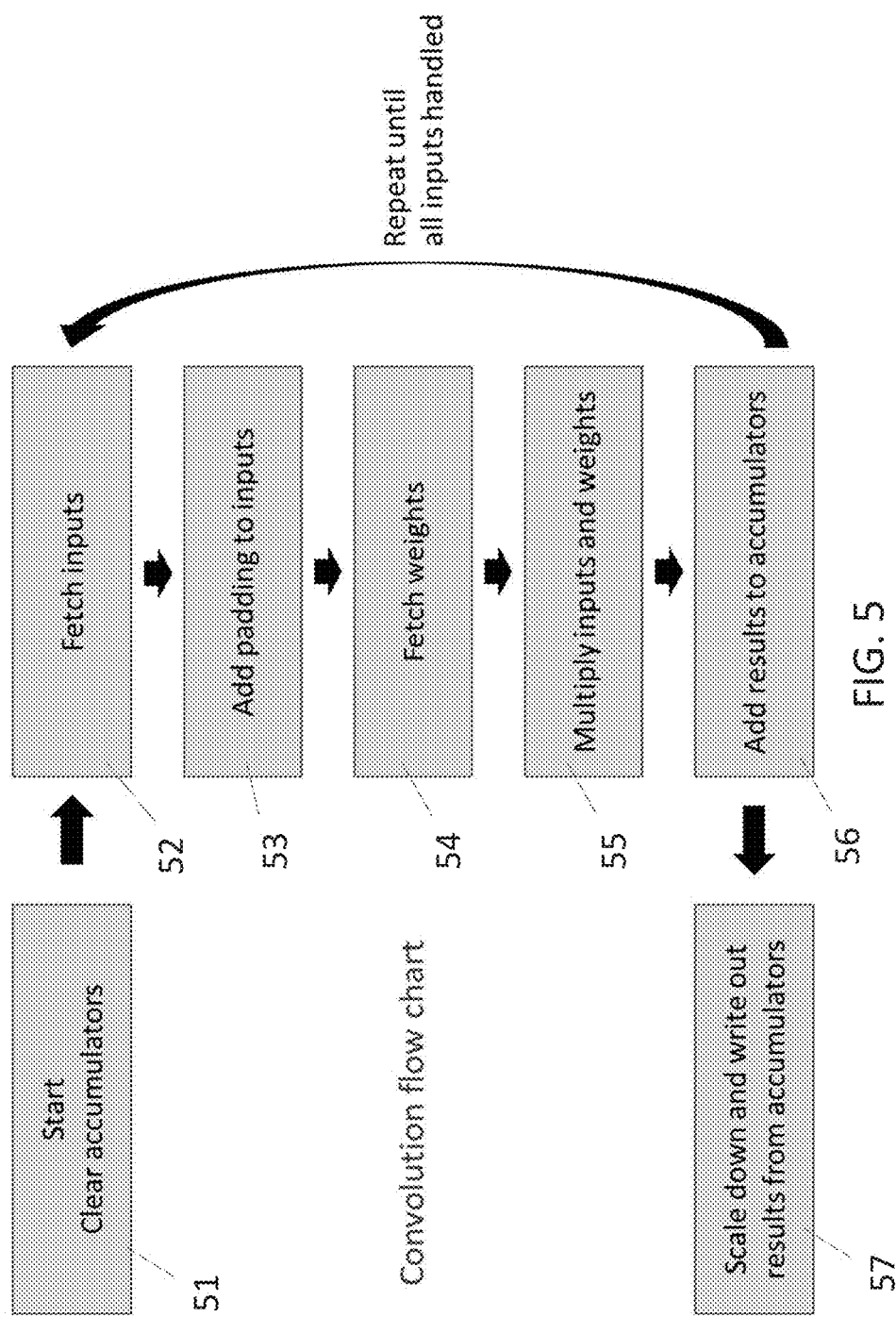
FIG. 5 is a flowchart showing a convolution process in accordance with an embodiment of the technology described herein.

FIG. 5 shows a process by which the combined convolution and pooling engine of FIG. 4 can perform a convolution operation, according to an embodiment.

At step 51, accumulators 46 are cleared, and at step 52 the input feature map read circuit 41 fetches data of the input feature map from the memory 8 to process. At step 53, padding circuit 42 applies zero padding to the input data array (if appropriate).

At step 54, the weight read circuit 43 reads, from the memory 8, weight values of the convolution kernel that is to be applied to the input array. Then at step 55, the multiply/bypass circuit 44 performs element wise multiplication operations between input values of the (padded) input feature map, and corresponding weight values of the convolution kernel. Outputs of the multiply/bypass circuit 44 are added to accumulators 46 by add/max circuit 45 at step 56.

Steps 52 to 56 may be repeated as appropriate for each input that is to be processed.

Then, at step 57, the output scale circuit 47 scales the final results stored in accumulators 46 to a desired number of bits, and writes out the scaled results to an output feature map in the memory 8.

Figure 6:
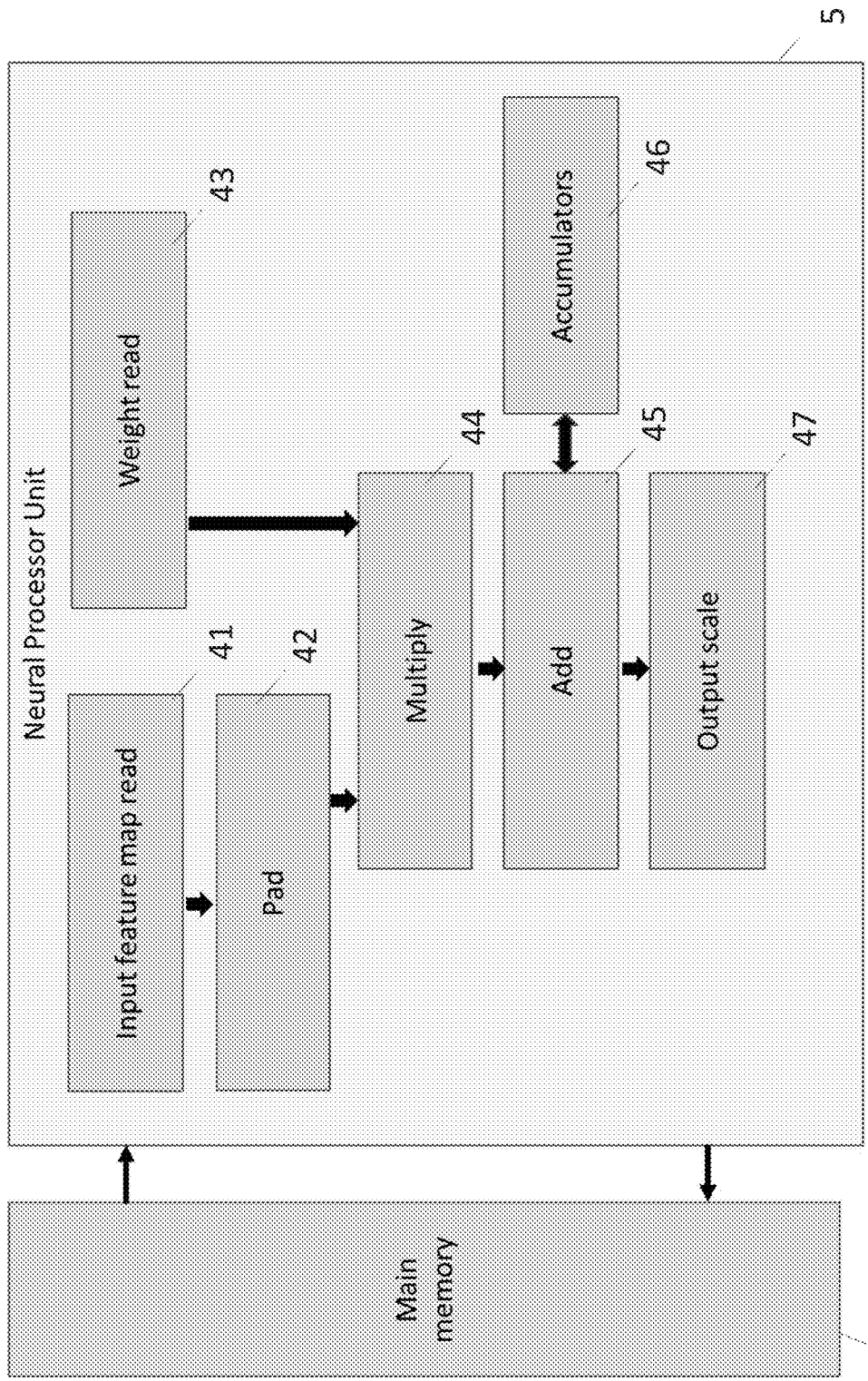
FIG. 6 shows schematically the configuration of the neural network processing unit (NPU) of FIG. 4 when performing a convolution operation in an embodiment of the technology described herein.

FIG. 6 shows schematically the effective configuration of the combined convolution and pooling engine of FIG. 4 when performing a convolution operation as shown in FIG. 5.

As shown in FIG. 6, when perform a convolution operation, the input feature map read circuit 41 reads, from the external memory 8, data of an input feature map (IFM) that is to undergo a convolution operation. The padding circuit 42 is then controlled by the control circuit 49 to pad the input data array with zeros appropriately.

The control circuit 49 further controls the weight read circuit 43 to read, from the external memory 8, weight values of a convolution filter kernel that is to be applied to an input feature map to calculate a convolution.

The control circuit 49 then controls the multiply/bypass circuit 44, add/max circuit 45 and accumulators (registers) 46 to operate as a multiply-accumulate (MAC) circuit. Accordingly, the multiply/bypass circuit 44 is controlled to operate in a multiply mode to perform element wise multiplication operations between input values of an (padded) input feature map and weight values of a convolution kernel. The add/max circuit 45 is controlled to operate in an add mode to add outputs of the multiply/bypass circuit 44 to accumulators 46.

The output scale circuit 47 is then controlled by the control circuit 49 to scale outputs of accumulators 46 to a desired number of bits, and to write out the results to an output feature map in the external memory 8.

Figure 7:
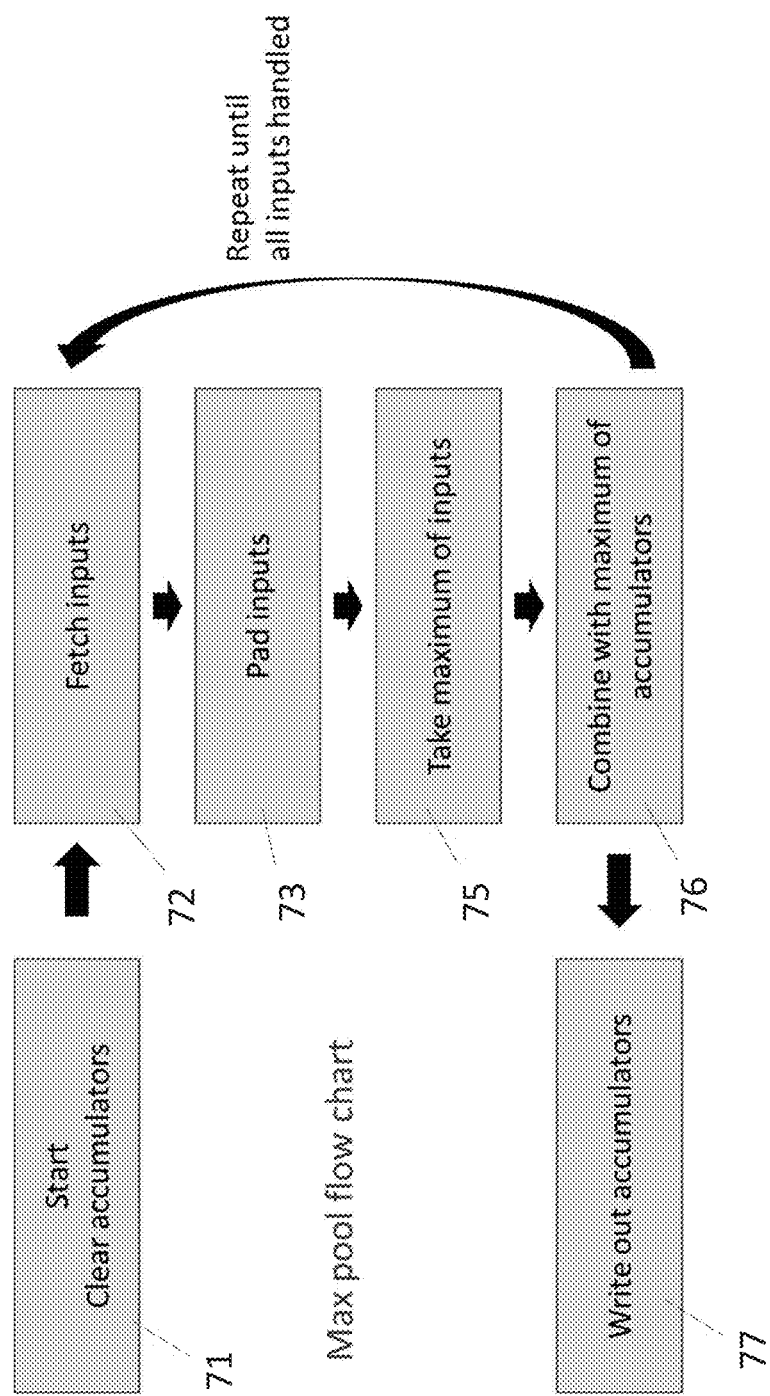
FIG. 7 is a flowchart showing a maximum pooling process in accordance with an embodiment of the technology described herein.

FIG. 7 shows a process by which the combined convolution and pooling engine of FIG. 4 can perform a maximum pooling operation, according to an embodiment.

At step 71, accumulators 46 are cleared, and at step 72 the input feature map read circuit 41 fetches data of the input feature map from the memory 8 to process. At step 73, padding circuit 42 applies minimum value padding to the input data array (if appropriate).

The multiply/bypass circuit 44 then operates in a bypass mode to pass (padded) input data array values onwards to add/max circuit 45 without performing a multiplication operation.

Then, at step 75, the add/max circuit 45 determines a maximum value of input data values within a pooling window, and at step 76 writes the determined maximum to accumulators 56.

Steps 72 to 76 may repeated as appropriate for each input that is to be processed.

Then, at step 77, the output scale circuit 47 scales the final results stored in accumulators 46 to a desired number of bits, and writes out the scaled results to an output feature map in the memory 8.

Figure 8:
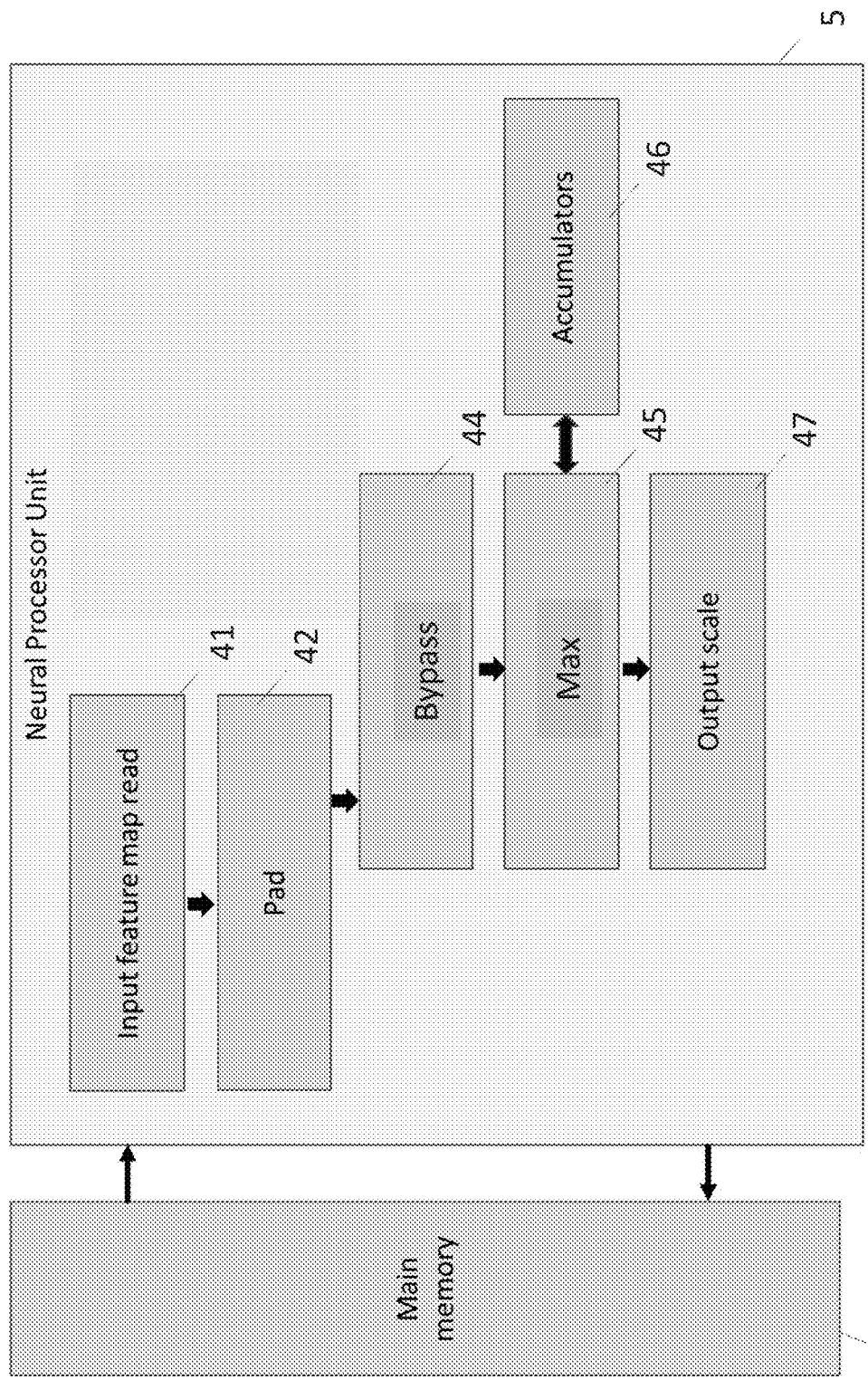
FIG. 8 shows schematically the configuration of the neural network processing unit (NPU) of FIG. 4 when performing a maximum pooling operation in an embodiment of the technology described herein.

FIG. 8 shows schematically the effective configuration of the combined convolution and pooling engine of FIG. 4 when perform the maximum pooling operation as shown in FIG. 7.

As shown in FIG. 8, when perform a maximum pooling operation, the input feature map read circuit 41 reads, from the external memory 8, data of an input feature map (IFM) that is to undergo a maximum pooling operation. The padding circuit 42 is then controlled by the control circuit 49 to pad the input data array with minimum values appropriately.

The control circuit 49 then controls the multiply/bypass circuit 44 to operate in a bypass mode, and the add/max circuit 45 is controlled by the control circuit 49 to operate in a maximum mode to determine maxima of input data values within respective pooling windows, and store the determined maximum values in accumulators 46.

The output scale circuit 47 is controlled by the control circuit 49 to scale outputs of accumulators 46 to a desired number of bits, and to write out the results to an output feature map in the external memory 8.

Figure 9:
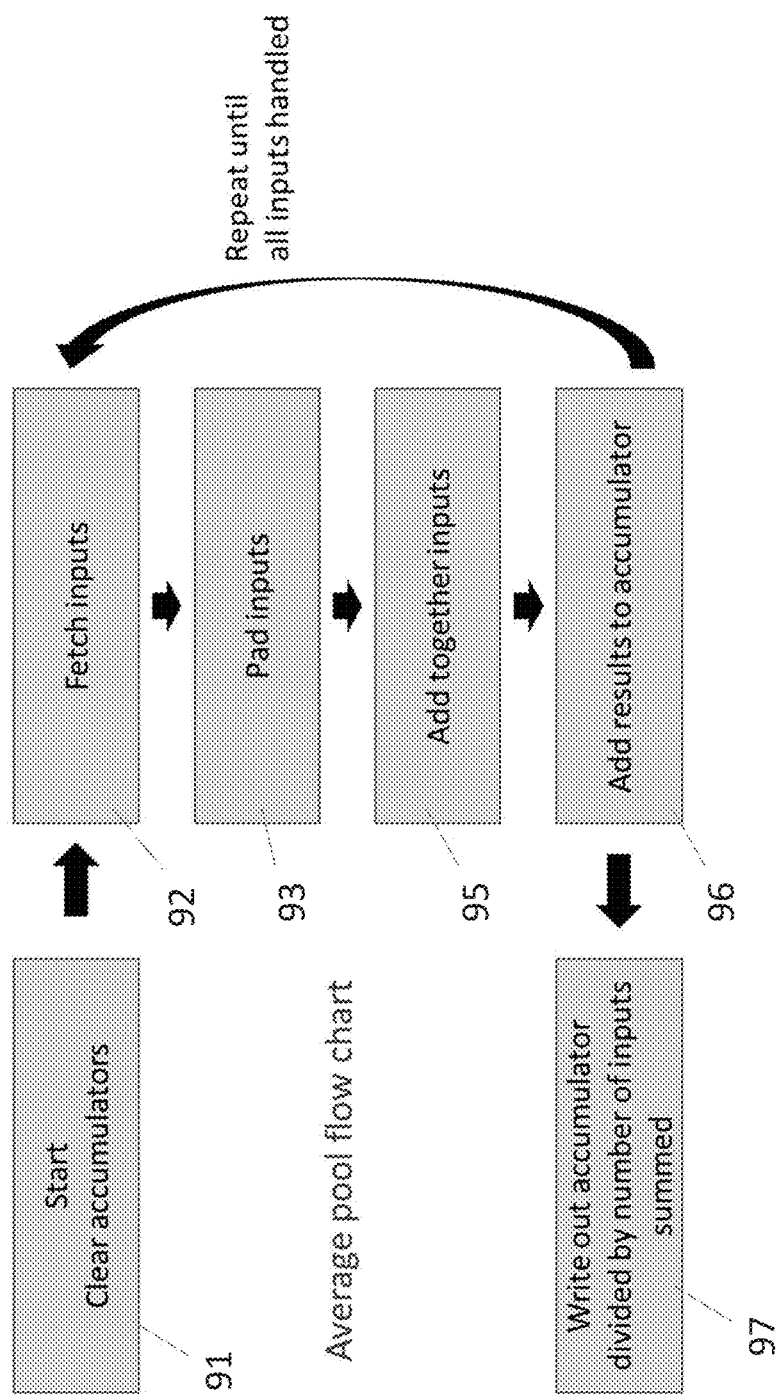
FIG. 9 is a flowchart showing an average pooling process in accordance with an embodiment of the technology described herein.

FIG. 9 shows a process by which the combined convolution and pooling engine of FIG. 4 can perform an average pooling operation, according to an embodiment.

At step 91, accumulators 46 are cleared, and at step 92 the input feature map read circuit 41 fetches data of the input feature map from the memory 8 to process. At step 93, padding circuit 42 applies zero padding to the input data array (if appropriate).

The multiply/bypass circuit 44 then operates in a bypass mode to pass (padded) input data array values onwards to add/max circuit 45 without performing a multiplication operation.

Then, at steps 95 and 96, the add/max circuit 45 operates to sum input data values within a pooling window by adding the values to accumulators 46, and average divisor circuit 48 counts the number of "valid" elements that have been summed to determine an appropriate divisor value.

Steps 92 to 96 may repeated as appropriate for each input that is to be processed.

Then, at step 97, the output scale circuit 47 divides values stored in accumulators 46 by appropriate divisor values determined by the average divisor circuit 48, scales the results to a desired number of bits, and writes out the final results to an output feature map in the memory 8.

Figure 10:
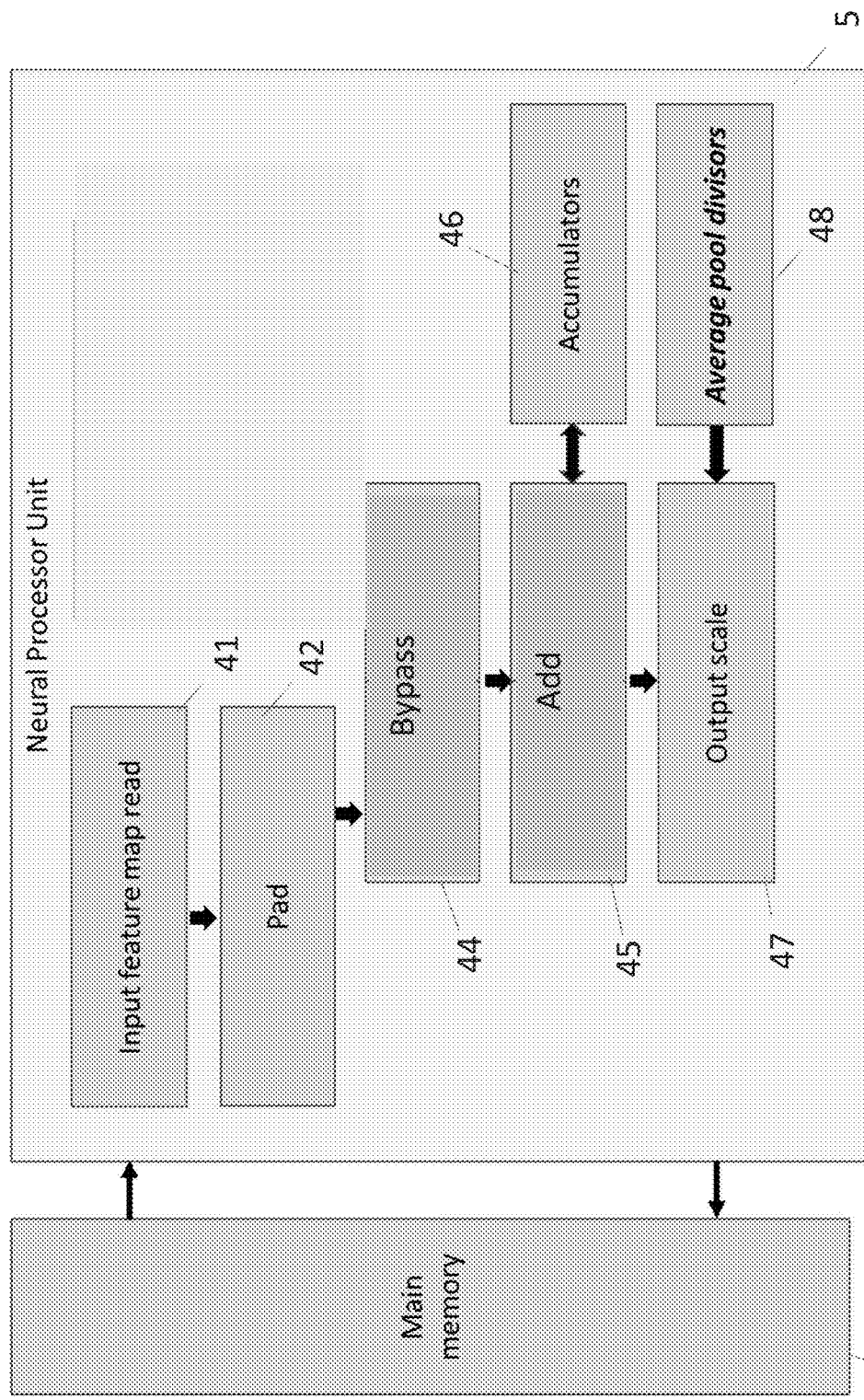
FIG. 10 shows schematically the configuration of the neural network processing unit (NPU) of FIG. 4 when performing an average pooling operation in an embodiment of the technology described herein.

FIG. 10 shows schematically the effective configuration of the combined convolution and pooling engine of FIG. 4 when perform the average pooling operation as shown in FIG. 9.

As shown in FIG. 10, the input feature map read circuit 41 reads, from the external memory 8, data of an input feature map (IFM) that is to undergo an average pooling operation. The padding circuit 42 is then controlled by the control circuit 49 to pad the input data array with zeros appropriately.

The control circuit 49 then controls the multiply/bypass circuit 44 to operate in a bypass mode, and the add/max circuit 45 is controlled by the control circuit 49 to operate in an add mode to add outputs of the multiply/bypass circuit 44 to accumulators 46.

The average divisor circuit 48 is controlled by the control circuit 49 to count the number of valid elements summed by the add/max circuit 45 to determine a divisor to use to determine a mean of summed data values.

The output scale circuit 47 is controlled by the control circuit 49 to scale outputs of accumulators 46 to a desired number of bits, to divide outputs of accumulators 46 by a determined divisor, and to write out the results to an output feature map in the external memory 8.

In this way, the combined convolution and pooling engine of FIG. 4 is able to perform convolution, maximum pooling and average pooling using shared fixed function hardware circuits.

Although in the above embodiments, the combined convolution and pooling engine comprises a multiply/bypass circuit 44 that is configured to be able operate in a bypass mode in which the multiply/bypass circuit 44 does not perform a multiplication operation, operating in a bypass mode is not essential.

For example, in other embodiments, the combined convolution and pooling engine operates to perform a pooling operation by multiplying input data values by unity, and accumulating the so-multiplied values. For example, in an embodiment, the combined convolution and pooling engine performs a pooling operation by performing a multiply-accumulate operation with each weight value set to 1. To do this, unity weight values may be stored in the memory 8, and read therefrom by the weight read circuit 43, or alternatively the combined convolution and pooling engine may be configured to generate unity weight values "on the fly".

Although in the above embodiments, the average divisor circuit 48 counts valid elements to determine appropriate divisor values when performing an average pooling operation, in other embodiments divisor values are looked up in a look-up table, e.g. based on the position in an input and/or output array that a data value being processed represents.

It will be appreciated from the above that the technology described herein, in its embodiments at least, provides arrangements in which neural network convolution and pooling operations can be performed in an efficient manner. This is achieved, in the embodiments of the technology described herein at least, by providing a neural network processing unit (processor) having a combined convolution and pooling engine comprising plural fixed function circuit elements, at least some of which are utilised both when performing convolution operations and when performing pooling operations.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A neural network processor operable to execute a neural network, the neural network processor comprising:
a combined convolution and pooling circuit configured to perform convolution and pooling operations for the neural network being executed by the neural network processor; the combined convolution and pooling circuit comprising:
a multiply circuit configured to determine a product of data values;
storage configured to store data values; and
an add circuit configured to add a data value to a data value stored in the storage so as to accumulate data values in the storage;
the combined convolution and pooling circuit further comprising at least one of:
a divisor circuit configured to determine a divisor value to use to determine a mean of data values accumulated in the storage; and
a maximum circuit configured to determine a maximum value of data values, and to store the determined maximum value in the storage;
wherein the combined convolution and pooling circuit further comprises:
a padding circuit configured to pad an array of input data values, wherein the padding circuit is selectively configurable to:
pad an array of input data values with zeros; and to:
pad an array of input data values with a minimum value for the array.

2. The network processor of claim 1, wherein the combined convolution and pooling circuit comprises both the divisor circuit and the maximum circuit.

3. The neural network processor of claim 1, wherein the storage comprises one or more registers.

4. The neural network processor of claim 1, wherein the combined convolution and pooling circuit comprises the divisor circuit, the combined convolution and pooling circuit further comprising:
a division circuit configured to divide a data value in the storage by a divisor value determined by the divisor circuit.

5. The neural network processor of claim 4, wherein the combined convolution and pooling circuit comprises an output circuit that comprises the division circuit, and the output circuit is selectively configurable to:
write out a data value in the storage to a memory; and to:
divide a data value in the storage by a divisor value determined by the divisor circuit, and then write out the result of the division operation to the memory.

6. The neural network processor of claim 1, wherein the multiply circuit comprises a bypass circuit, and the multiply circuit is selectively configurable to:
determine a product of data values; and to:
pass data values onwards unchanged via the bypass circuit.

7. The neural network processor of claim 1, wherein the combined convolution and pooling circuit comprises a combined add and maximum circuit that comprises the add circuit and the maximum circuit, and the combined add and maximum circuit is selectively configurable to:
add a data value to a data value stored in the storage so as to accumulate data values in the storage; and to:
determine a maximum value of data values, and store the determined maximum value in the storage.

8. A data processing system comprising the neural network processor of claim 1.

9. A method of performing convolution and/or pooling operations when executing a neural network on a neural network processor, the neural network processor comprising:
a combined convolution and pooling circuit configured to perform convolution and pooling operations for the neural network being executed by the neural network processor; the combined convolution and pooling circuit comprising:
a multiply circuit configured to determine a product of data values;
storage configured to store data values;
a divisor circuit configured to determine a divisor value to use to determine a mean of data values accumulated in the storage; and
a combined add and maximum circuit comprising:
an add circuit configured to add a data value to a data value stored in the storage so as to accumulate data values in the storage; and
a maximum circuit configured to determine a maximum value of data values, and to store the determined maximum value in the storage;
wherein the combined add and maximum circuit is selectively configurable to:
add a data value to a data value stored in the storage so as to accumulate data values in the storage; and to:
determine a maximum value of data values, and store the determined maximum value in the storage;
the method comprising:
the neural network processor executing the neural network; and
the combined convolution and pooling circuit performing at least one of a convolution operation, an average pooling operation and a maximum pooling operation for the neural network executing on the neural network processor;
wherein the combined convolution and pooling circuit performing the convolution operation for the neural network executing on the neural network processor comprises:
the multiply circuit determining products of corresponding input feature map and convolution kernel weight values; and
the combined add and maximum circuit accumulating the products determined by the multiply circuit in the storage; and
the combined convolution and pooling circuit performing the average pooling operation for the neural network executing on the neural network processor comprises:
the combined add and maximum circuit accumulating input feature map data values in the storage; and
the divisor circuit determining a divisor value to use to determine a mean of the input feature map data values accumulated in the storage by the add circuit; and
the combined convolution and pooling circuit performing the maximum pooling operation for the neural network executing on the neural network processor comprises:
the combined add and maximum circuit determining a maximum value of input feature map data values, and storing the determined maximum value in the storage.

10. The method of claim 9, wherein the storage comprises one or more registers.

11. The method of claim 9, wherein the combined convolution and pooling circuit further comprises a division circuit configured to divide a data value in the storage by a divisor value determined by the divisor circuit; and wherein the combined convolution and pooling circuit performing the average pooling operation for the neural network executing on the neural network processor further comprises:

the division circuit dividing the accumulated data value in the storage by the divisor value determined by the divisor circuit.

12. The method of claim 11, wherein the combined convolution and pooling circuit comprises an output circuit that comprises the division circuit, and the output circuit is selectively configurable to:

write out a data value in the storage to a memory; and to:
divide a data value in the storage by a divisor value determined by the divisor circuit, and then write out the result of the division operation to the memory;

wherein the combined convolution and pooling circuit performing the convolution operation for the neural network executing on the neural network processor comprises:

the output circuit writing out the accumulated data value in the storage to the memory;

wherein the combined convolution and pooling circuit performing the average pooling operation for the neural network executing on the neural network processor comprises:

the output circuit dividing the accumulated data value in the storage by the divisor value determined by the divisor circuit; and then
writing out the result of the division operation to the memory; and wherein the combined convolution and pooling circuit performing the maximum pooling operation for the neural network executing on the neural network processor comprises:

the output circuit writing out the maximum value in the storage to the memory.

13. The method of claim 9, wherein the combined convolution and pooling circuit further comprises:

a padding circuit selectively configurable to:
pad an array of input data values with zeros; and to:
pad an array of input data values with a minimum value for the array;

wherein the combined convolution and pooling circuit performing the convolution operation for the neural network executing on the neural network processor comprises:

the padding circuit padding an array of input data values with zeros;

wherein the combined convolution and pooling circuit performing the average pooling operation for the neural network executing on the neural network processor comprises:

the padding circuit padding an array of input data values with zeros; and wherein the combined convolution and pooling circuit performing the maximum pooling operation for the neural network executing on the neural network processor comprises:

the padding circuit padding an array of input data values with a minimum value for the array.

14. The method of claim 9, wherein the multiply circuit comprises a bypass circuit, and the multiply circuit is selectively configurable to:

determine a product of data values; and to:
pass data values onwards unchanged via the bypass circuit;

wherein the combined convolution and pooling circuit performing the average pooling operation for the neural network executing on the neural network processor further comprises:

the multiply circuit passing the input feature map data values onwards unchanged to the combined add and maximum circuit via the bypass circuit; and wherein the combined convolution and pooling circuit performing the maximum pooling operation for the neural network executing on the neural network processor further comprises:

the multiply circuit passing the input feature map data values onwards unchanged to the combined add and maximum circuit via the bypass circuit.

15. A non-transitory computer readable storage medium storing software code which when executing on a processor performs the method of claim 11.

16. A method of performing convolution and/or pooling operations when executing a neural network on a neural network processor, the neural network processor comprising:

a combined convolution and pooling circuit configured to perform convolution and pooling operations for the neural network being executed by the neural network processor; the combined convolution and pooling circuit comprising:

a multiply circuit configured to determine a product of data values;
storage configured to store data values;
an add circuit configured to add a data value to a data value stored in the storage so as to accumulate data values in the storage;
a divisor circuit configured to determine a divisor value to use to determine a mean of data values accumulated in the storage; and
a maximum circuit configured to determine a maximum value of data values, and to store the determined maximum value in the storage;

wherein the multiply circuit comprises a bypass circuit, and the multiply circuit is selectively configurable to:
determine a product of data values; and to:
pass data values onwards unchanged via the bypass circuit;

the method comprising:
the neural network processor executing the neural network; and
the combined convolution and pooling circuit performing at least one of a convolution operation, an average pooling operation and a maximum pooling operation for the neural network executing on the neural network processor;

wherein the combined convolution and pooling circuit performing the convolution operation for the neural network executing on the neural network processor comprises:

the multiply circuit determining products of corresponding input feature map and convolution kernel weight values; and
the add circuit accumulating the products determined by the multiply circuit in the storage; and wherein the combined convolution and pooling circuit performing the average pooling operation for the neural network executing on the neural network processor comprises:

the multiply circuit passing input feature map data values onwards unchanged to the add circuit via the bypass circuit;

the add circuit accumulating the input feature map data values in the storage; and the divisor circuit determining a divisor value to use to determine a mean of the input feature map data values accumulated in the storage; and wherein the combined convolution and pooling circuit performing the maximum pooling operation for the neural network executing on the neural network processor comprises:

the multiply circuit passing input feature map data values onwards unchanged to the maximum circuit via the bypass circuit; and the maximum circuit determining a maximum value of the input feature map data values, and storing the determined maximum value in the storage.

\* \* \* \* \*

UNITED STATES PATENT AND TRADEMARK OFFICE
CERTIFICATE OF CORRECTION

PATENT NO. : 11,537,860 B2  
APPLICATION NO. : 16/826586  
DATED : December 27, 2022  
INVENTOR(S) : Holm et al.

Page 1 of 1

It is certified that error appears in the above-identified patent and that said Letters Patent is hereby corrected as shown below:

On the Title Page

Item (54), and in the Specification Column 1, Line 1/Title, please replace "NET WORK" with
-- NETWORK --

In the Claims

Column 26, Line 55 (Claim 9, Line 55) please replace "storage by the add circuit; and" with
-- storage; and --

Signed and Sealed this
Fourth Day of April, 2023

Katherine Kelly Vidal  
*Director of the United States Patent and Trademark Office*